May 19, 1970

J. R. ALBURGER

PROCESS FOR FLUORESCENCE DETECTION OF EXTREMELY THIN TRACER FILMS

Original Filed Oct. 4, 1965

Re. 26,888

INVENTOR.

James R. Alburger

United States Patent Office

Re. 26,888
Reissued May 19, 1970

26,888

PROCESS FOR FLUORESCENCE DETECTION OF EXTREMELY THIN TRACER FILMS

James R. Alburger, 5007 Hillard Ave.,
La Canada, Calif. 91011

Original No. 3,386,920, dated June 4, 1968, Ser. No. 492,674, Oct. 4, 1965, which is a continuation-in-part of application Ser. No. 323,529, Nov. 13, 1963, which is a continuation-in-part of application Ser. No. 149,061, Oct. 31, 1961, which in turn is a continuation-in-part of application Ser. No. 82,374, Jan. 13, 1961. Application for reissue May 19, 1969, Ser. No. 830,903
Int. Cl. C09k *1/02;* G01n *21/38*
U.S. Cl. 252—301.2 23 Claims

Matter enclosed in heavy brackets [ ] appears in the original patent but forms no part of this reissue specification; matter printed in italics indicates the additions made by reissue.

*ABSTRACT OF THE DISCLOSURE*

*A fluorescence inspection process for the detection of extremely thin films of fluorescent tracers. Conventional fluorescent tracer processes have utilized solutions of fluorescent dyes which exhibit dimensional thresholds of fluorescence response larger than about 250 millimicrons. In newly discovered supersensitive fluorescent tracer processes, where it is desired to exhibit the presence of thin layers of tracer material, smaller than about 250 millimicrons, certain tracer compositions may be formulated using one or more fluorescent "sensitizer" dyes, with or without color former dyes, dissolved in a carrier liquid at a concentration greater than about 15 grams per pint, and the thus-formulated tracer compositions may be applied to test surfaces for thin-film fluorescence detection.*

*RELATED PATENTS AND PATENT APPLICATIONS*

*U.S. Pat. No. 3,107,298, issued Oct. 15, 1963, for Apparatus for the Measurement of Fluorescent Tracer Sensitivity.*

*U.S. Pat. No. 3,184,596, issued May 18, 1965, for Flaw Detection Method Using a Liquid Solvent Developer.*

*U.S. Pat. No. 3,311,479, issued Mar. 28,1967, for Penetrant Inspection Process and Compositions.*

*U.S. Pat. No. 3,320,417, issued May 16, 1967, for Fluorescent Image-Forming Screen.*

*Application Ser. No. 728,458, filed May 13, 1968, for Method and Means of Preventing fraud in Documents.*

The present application is a continuation-in-part of my copending application, Ser. No. 323,529, filed Nov. 13, 1963, for Fluorescent Tracers, which latter application was a continuation-in-part of my application, Ser. No. 149,061, filed Oct. 31, 1961, for Fluorescent Tracers, which last application was a continuation-in-part of my application, Ser. No. 82,374, filed Jan. 13, 1961, for Fluorescent Penetrant Tracers, all now abandoned.

The present invention relates to fluorescent tracers, and more particularly to fluorescent tracers having improved sensitivity performance characteristics.

Fluorescent tracers are well known in the prior art, and have usually been comprised of one or more fluorescent dyes suspended in a suitable carrier material. These tracers have found advantageous usage in industrial inspection processes. Thus, such tracers have been employed in the detection of surface flaws in parts constructed of metal, ceramic, or other material. When used for this purpose, the fluorescent dye and carrier is utilized in the form of a penetrant liquid which forms entrapments in the flaws and renders the latter more readily detectable than might be the case with ordinary visible colored dyes.

In the use of fluorescent penetrants for detection of extremely small flaws, it has heretofore been thought that the ability of the tracer to detect the flaws is a function of its fluorescent brightness. Basically, fluorescent brightness, of course, depends upon the particular fluorescent dye or dyes used. However, such brightness can be enhanced by the well known effect of "cascading of fluorescence." Whereas the brightness effects produced by combinations of two or more fluorescent dyes are ordinarily approximately additive, cascading involves the transfer of radiant energy from one dye component to another, with a consequent increase in brightness which is more than merely additive.

Since, as has been pointed out, the sensitivity of a fluorescent substance as regards its ability to reveal its presence in microtraces has been equated directly with fluorescent brightness, it has often been the practice in industrial inspection processes to attempt to maximize such sensitivity of the fluorescent tracer used by increasing the fluorescent brightness thereof; e.g., through the use of the aforementioned effect of cascading of fluorescence. Thus, when a flaw and its tracer entrapment are so small as to be virtually invisible under black light, it has usually been felt necessary to employ a tracer of increased fluorescent brightness so as to make the flaw detectable. However, in spite of the attempts heretofore made to maximize the sensitivity of fluorescent penetrant materials by increasing the fluorescent brightness thereof, presently known fluorescent penetrant tracers are unable to detect extremely small flaws which may result from such effects as inter-crystalline corrosion or "creep cracks," and which may have dimensional magnitudes on the order of $10^{-5}$ to $10^{-6}$ centimeters.

The failure in the prior art to produce fluorescent tracers which are able to detect flaws of such small dimensional magnitude has resulted primarily from the emphasis which has been laid on the fluorescent brightness of the particular dyes employed, as discussed above. The possibility of improving fluorescent response through increase in concentration of the dye used has not been given consideration. In fact, the prevailing belief is that any substantial increase in dye concentration is constra-indicated. Such belief is based on the generally accepted assumption that fluorescent brightness response tends to be "self-quenching" when the fluorescent dye is used in a concentration in solution above an approximate range of about 0.5% to 2% by weight.

In addition to the aforementioned shortcomings of known fluorescent dyes when used for certain applications in the penetrant inspection field, such dyes have also been unable to serve adequately for other detection or testing purposes, or for marking, decoration, and other applications in which thin-film characteristics are desired.

The principal object of the invention, therefore, is to provide improved fluorescent tracer materials.

Another object of the present invention is to provide fluorescent tracer materials having improved sensitivity performance characteristics.

Still another object of the present invention is to provide fluorescent tracers which exhibit sensitivity levels far greater than that obtainable through enhancement of fluorescent brightness.

A further object of the present invention is to provide fluorescent tracers having improved characteristics for testing, marking, decorative, and other purposes in which thin-film properties are desirable.

A still further object of the invention is to provide fluorescent tracers for penetrant inspection purposes, capable of detecting flaws having dimensional magnitudes within a range as low as $10^{-5}$ to $10^{-6}$ cm. or smaller.

These and other objects of the invention will become more apparent from the following description thereof when read in conjunction with the accompanying drawings, in which.

Figure 1:
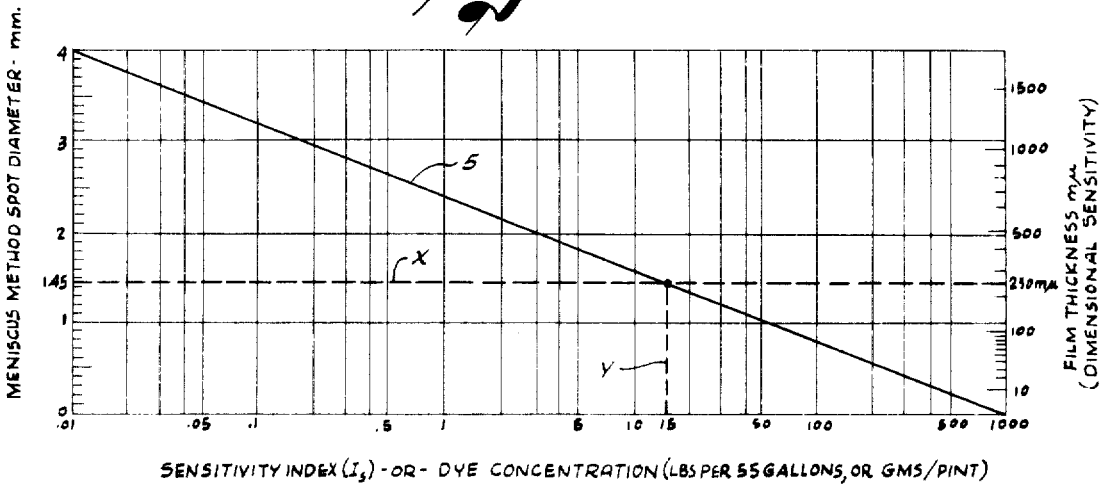
FIG. 1 is a chart employable in conjunction with the use of the fluorescent tracers of the invention, a reading of said chart for a particular tracer being shown.

The present invention provides fluorescent tracers, each of which is formulated essentially by the solution in a suitable solvent of a fluorescent sensitizer selected from a group to be defined hereinbelow, and at least to a minimum level of concentration up to a maximum level of concentration depending on the solubility limit of the sensitizer, as will be described. In order to understand the reason for the particular grouping of sensitizers made, and for the set minimum level of concentration, reference should first be made to the concept, which I have formulated, of "thin-film fluorescence." In accordance with this concept, a fluorescent sensitizer, such as a fluorescent dye or other fluorescent substance, when in solution exhibits the characteristic of a threshold of film thickness below which fluorescence response ceases. Thus, for a given fluorescent dye dissolved in a particular carrier at a particular concentration, there exists a specific film thickness below which there is no fluorescence, and above which there is a fluorescence response. The threshold thickness of the tracer film may be termed the "dimensional sensitivity" of the fluorescent tracer. The concept of thin-film fluorescence is applicable to a fluorescent substance in solution in a solid form (e.g., as a plastic or resinous material) as well as in liquid form.

As part of my discovery, it has been found that the dimensional sensitivity of a fluorescent sensitizer is independent of the color or fluorescent brightness thereof. Instead, each fluorescent sensitizer substance can be assigned a specific sensitivity value k, as will be described hereinbelow, and the dimensional sensitivity is a function of k and the concentration C of the sensitizer. The dimensional sensitivity of a given fluorescent sensitizer can, over a useful range of concentrations, be determined by a method to be described below. In conjunction with such method, there may be measured, for each fluorescent material in solution, a sensitivity index $I_s$ value, which is defined in accordance with the following relationship:

$$I_s = kC$$

The sensitivity index $I_s$ value of a fluorescent material in solution is a direct function of the threshold film thickness of said material, and serves as a convenient means of expressing the dimensional sensitivity thereof.

For the purpose of measuring the dimensional sensitivity of a fluorescent material in solution, and also of determining the $I_s$ value thereof, I employ a Meniscus Method, which is described in my U.S. Pat. No. 3,107,298, granted Oct. 15, 1963, for Apparatus for the Measurement of Fluorescent Tracer Sensitivity. In practicing the invention disclosed in the latter patent, a flat glass platen is positioned under a black light, and a drop of liquid having dissolved therein a fluorescent substance is placed on the platen. A convex lens having a preferred radius of curvature of 106 cm. is then placed over the drop of liquid, and so as to rest on the platen. At the point of contact between the lens and the platen, the liquid film has a thickness of substantially zero, and a meniscus-shaped film surrounds said contact point.

As pointed out in Pat. No. 3,107,298, the thickness of the liquid film varies continuously with the radial distance from the contact point. However, the fluorescence response as seen under black light is a distinctly discontinuous function, so that a nonfluorescent "spot" is seen in the region of the contact point. If the flat platen is made of a black glass, the nonfluorescent spot appears as a black spot which contrasts sharply with the surrounding area of fluorescence, and which can be measured as to its diameter with good accuracy. The diameter of this black spot is used as a measure of the film thickness above which the fluorescence response occurs, and below which fluorescence ceases. For a given fluorescent sensitizer dissolved in a particular solvent material, the diameter of the black spot varies depending upon the concentration of the fluorescent sensitizer.

Inasmuch as the transition of fluorescence response, with respect to film thickness, is really a continuous function, the toe of the transition curve approaches zero response as the film thickness is made smaller, but, theoretically at least, never actually reaches zero. As a practical matter in locating the point corresponding to the so-called dimensional threshold of fluorescence, a point on the transition characteristic curve of the tracer is taken at a film thickness which is one-tenth ($1/10$) the film thickness at the midpoint of the transition curve, where the brightness of fluorescence response falls to a value below about 2% to 7% of the maximum brightness which appears in a relatively thick film of the tracer composition. In the above-mentioned Meniscus Method test, the diameter of the black spot would be taken as the distance between the points where brightness response begins to rise fairly steeply, at the 2% to 7% values of maximum brightness as indicated above.

In measuring the fluorescent characteristics of various materials, employing the above-described Meniscus Method, I have discovered that fluoranthene ($C_{16}H_{10}$) exhibits fluorescent characteristics which render it useful in the establishment of a reference standard, against which the performance of a fluorescent material may be evaluated. Referring, now, to FIG. 1, a five-cycle single logarithmic chart is shown having a logarithmic horizontal, or abscissa, scale representing $I_s$ values, ranging from .01 to 1000. The vertical, or ordinate, scale at the left represents "spot diameters" as determined by the above-described Meniscus Method of measurement, and ranges from 0 to 4 mm. A straight line 5 is drawn as shown, between two points having respectively an ordinate of 4 and an abscissa of .01, and an ordinate of 0 and an abscissa of 1000. Said straight line provides a suitable reference characteristic for purposes of standardization, which reference characteristic corresponds to an imaginary fluorescent substance having a specific sensitivity k of unity 1.

Since the fluorescent properties of fluoranthene are closely approximated by those represented by the diagonal line 5, it is often convenient to use fluoranthene as a reference material in evaluating the threshold response characteristics of other sensitizer materials. In such usage, a series of tracer solutions of fluoranthene may be prepared having accurately measured concentrations of fluoranthene in a suitable solvent carrier such as N-methyl-2-pyrrolidone, as for Examples 2, 5, 10, 15, 25, 40, 75, 100, 150, 200, etc., grams per pint. N-methyl-2-pyrrolidone is mentioned as a suitable solvent for fluoranthene since it will dissolve this sensitizer to concentrations greater than 200 grams per pint at room temperature. The unit of measure, grams per pint, is used for the reason that such values are numerically equal to pounds per 55 gallons, so that laboratory test results may be quickly and conveniently translated for production of drum quantities of material.

If a series of lens and platen setups are prepared side-by-side under black light using the above-described fluoranthene solutions, they will exhibit a graduated scale of spot diameters ranging from 3 mm. or more down to as small as .5 mm. or less. If, then, a test solution of a given fluorescent sensitizer is prepared in a suitable solvent carrier and to a certain concentration, for example, 15 grams per pint, a Meniscus Method test of such solution will provide a characteristic spot diameter which may be quickly estimated by a visual comparison with the fluoranthene scale. For example, if the test material, at a concentration of 15 grams per pint yields a spot diameter similar to fluoranthene at 40 grams per pint, then the $I_s$ value of the material is 40 and its k value is $40 \div 15 = 2.66$. By use of the above-outlined procedure, it has been possible to rapidly evaluate the fluorescence response characteristics of the many existing fluorescent dyes and other chemical materials so as to select those which are useful as sensitizers for the purpose of this invention, and which are listed hereinbelow.

It should be mentioned that fluorescence response characteristics, and likewise the k value for a given sensitizer material, may vary depending on the solvent carrier which is employed and the concentration level, so that in cases where precision in measurement is wanted, it is desirable to specify the conditions under which the measurements are made. For most practical purposes, adequate accuracy may be obtained by determining the k value for a sensitizer at a concentration of 15 grams per pint using a solvent carrier which has sufficient solvent capability for the sensitizer such that the concentration of 15 grams per pint is well below the saturation point of the solution. A wide variety of solvent materials may be employed, as will be described below.

At the right-hand side of the chart of FIG. 1, an ordinate scale, representing dimensional sensitivity (threshold film thickness) in millimicrons, is provided. In view of the geometry of the standard testing apparatus employed, and particularly in view of the known radius of curvature of the lens, the dimensional sensitivity (or threshold film thickness) is mathematically calculated, being a direct function of the spot diameter.

As will be clear, the dimensional sensitivity of a fluorescent dye solution is a basic physical characteristic thereof, and the Meniscus Method represents a convenient means for the determination of the value for this characteristic. It should be mentioned that nonfluorescent visible color dyes in solution also exhibit thin film dimensional thresholds similar to the behaviour of fluorescent substances. However, nonfluorescent dyes rarely if ever provide dimensional threshold properties smaller than 250 millimicrons, and their k values are virtually always less than about .1. Accordingly, fluorescent materials, and particularly those which have k values above about .2, and which are thus useful for the purpose of this invention, are in a category distinct from ordinary nonfluorescent visible color dyes or coloring materials or ordinary low-sensitivity fluorescent dyes.

Figure 2:
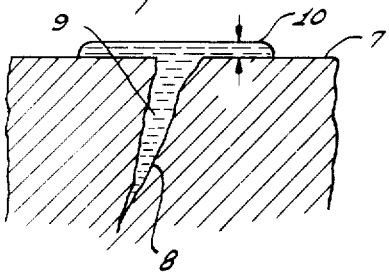
FIG. 2 is a diagrammatic representation of a surface flaw illustrating the use of tracer materials of the invention.

It will thus be understood that the dimensional sensitivity, or threshold film thickness, of a fluorescent material is a function of the specific sensitivity k of the sensitizer dye or other fluorescent substance employed, and of the concentration C of the latter. The important significance of the foregoing discussion with regard to dimensional sensitivity may be best understood by referring now to FIG. 2 which illustrates the behaviour of a fluorescent tracer of the invention as used in the well-known inspection penetrant process. A surface 7 has a small flaw 8 in the form of a crack, a porosity, or an intercrystalline separation. A liquid tracer, containing a fluorescent dye, is applied to surface 7 such that it enters the flaw 8 and forms an entrapment 9. The surface 7 is cleaned to remove residual penetrant tracer, after which the liquid entrapment exudes from the flaw 8 to form a micro-thin film 10 of liquid in the region of the surface flaw.

It will be understood that the amount of liquid which can exude from the flaw 8 depends on the size of the flaw, and likewise the thickness of the exuded tracer film will depend on the size of the surface flaw 8. If it is assumed that the thickness of the exuded film 10 is dimensionally of the same order of magnitude as the size of the surface flaw 8, then it follows that for an inspection penetrant to be capable of revealing the presence of flaws having dimensions of the order of a half-wavelength of light or 250 millimicrons, the dye tracer must have a dimensional threshold smaller than 250 millimicrons, and an $I_s$ value greater than about 15 as shown on the chart of FIG. 1.

Figure 3:
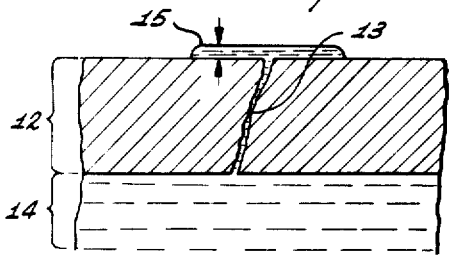
FIG. 3 is a diagrammatic representation of a leakage flaw illustrating the use of tracer materials of the invention.

Referring now to FIG. 3, which illustrates the behaviour of a liquid tracer of the invention as used in a leak detection process, a wall 12 of a tank or pipeline may be tested for liquid leaks through a microscopic leakage path 13 by applying a dyed liquid tracer 14 on one side of the wall 12 and allowing the dyed tracer to migrate through the leakage path 13, either by capillary action or by pressurizing the liquid. As the liquid tracer exudes from the leakage path 13, it may yield a micro-thin film 15 surrounding the point of leakage.

In cases where a leakage condition is extremely small, it may require quite a long time for a substantial thickness of the tracer film 15 to be generated. Thus, the leak detection capability of a dyed liquid leak tracer may may be equated with the thin-film indication response of the leak tracer. It will be understood that a fluorescent leak tracer, such as one which will yield a fluorescence response at film thickness of the order of 250 millimicrons as provided by the tracer liquids of this invention will be effective in the detection of micro-leaks which will be undetectable with solutions of ordinary nonfluorescent dyes or ordinary low-sensitivity fluorescent dyes.

Figure 4:
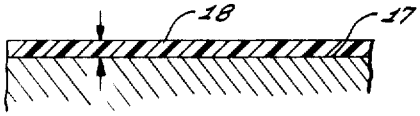
FIG. 4 is a diagrammatic representation of a thin film surface coating illustrating the use of tracer materials of the invention.

Referring now to FIG. 4, a surface 17 is coated with a thin film of plastic material 18 which is to act as an electrical insulating layer. For the purpose of this illustration, it is desired that the thickness of the applied insulating layer shall be smaller than a half wavelength of light or 250 millimicrons. At the same time, it may be desired that the presence of this thin insulating layer shall be revealed by its fluorescent response. It will be seen, therefore, that in order for such a layer to yield a fluorescence response, the $I_s$ value of the tracer material, of which the film consists, must be greater than about 15, as shown on the chart of FIG. 1.

Again referring to FIG. 4, the layer 18 may be formed by means of a waxy film from a crayon or by means of a marking ink. In soldering operations or in various chemical processes, fluorescence tagged soldering fluxes or chemical process materials may form layers of unwanted residues which are desired to be detected by means of their fluorescence response. In any event, and where the applied film is to exhibit fluorescence at film thicknesses smaller than 250 millimicrons, the $I_s$ value must be greater than about 15 as shown on the chart of FIG. 1.

Solutions of the fluorescent substances of this invention all exhibit thin-film fluorescence response thresholds at various concentrations corresponding approximately to those represented by the diagonal line in FIG. 1. Inasmuch as an $I_s$ value of 15 corresponds to a dye concentration of about 15 grams per pint, a class of particularly useful fluorescent tracers (i.e., those which yield fluorescence response at film thicknesses smaller than 250 millimicrons) may be defined as those which contain a fluorescent substance, as specified hereinbelow, within a range of proportional concentrations greater than at least about 15 grams per pint up to the limit of solubility of the fluorescent substance.

The sensitizers employed in accordance with the invention are selected so that each has a comparatively high k value, i.e., within the approximate range of .2 to 3. Certain of the sensitizers are identified below in accordance with their standard designations in the Color Index (2nd ed., 1956, vols. 1 to 4), published by the Society of Dyers and Colourists, Dean House, Piccadilly-Bradford, Yorkshire, England; the American Association of Textile Chemists and Colorists; and Lowell Technological Institute, Lowell, Mass., U.S.A. The k value, as determined by the comparison method described above, is indicated for each sensitizer thus listed.

For commercial usage, the Color Index listing provides an accurate designation for a given fluorescent dye. Certain other fluorescent materials, which are not normally considered to be dyestuffs, may be designated according to their appropriate chemical structures, as illustrated hereinbelow, or by their commonly employed chemical names. The many useful fluorescent dyes which are listed in the Color Index, and others which are not so listed, are well documented in the patent literature. It should be understood that not all fluorescent dyes are necessarily useful for the purpose of the invention. This is because certain fluorescent dyes may lack adequate solubility, or their k values may be excessively low. Substances which are useful for the purpose of this invention may be listed in groupings as follows. Color Index designations are given where applicable.

(a) Fluorescent (di)aminostilbine(di)sulfonic acid dyes.—Most of these dyes are characterized by k values in the range of from .2 to 3.

(b) Fluorescent dibenzothiophene dyes.—Most of these dyes are characterized by k values in the range of from .2 to 3.

(c) Fluorescent monoazole dyes.—These materials are characterized by k values in the range of from .2 to 3.

(d) Fluorescent bisazole dyes.—These materials are characterized by k values in the range of from .2 to 3.

(e) Fluorescent coumarin dyes.—These materials are characterized by k values in the range of from .2 to 3, usually above 1.

(f) Fluorescent perylene dyes.—These materials are characterized by k values in the range of .2 to 3, usually around .25.

(g) Fluorescent naphthalic acid imide dyes.—These materials are characterized by k values in the range of from 2 to 3.

(h) Fluorescent pyridotriazole dyes.—These materials are characterized by k values in the range from .2 to 3.

(i) Fluorescent di-hydrocollidine dyes.—These materials are characterized by k values in the range of from .2 to 3, usually around .25.

(j) Fluorescent acridine dyes.—These materials are characterized by k values in the range of from .2 to 3.

They are listed in the Color Index under the following Color Index (C.I.) designations.

C.I. Number:

| | | |
|---|---|---|
| 46000 | 46025 | 46050 |
| 46055 | 46060 | 46065 |
| 46080 | | |

C.I. Basic Orange 14, 15, 16, and 23.
C.I. Basic Yellow 6 and 9.

(k) Fluorescent xanthene dyes.—These materials are characterized by k values in the range of from .2 to 3, usually around .25. They are listed in the Color Index under the following Color Index designations.

C.I. Number:

| | | |
|---|---|---|
| 45000 | 45005 | 45006 |
| 45010 | 45015 | 45020 |
| 45050 | 45090 | 45095 |
| 45100 | 45105 | 45155 |
| 45165 | 45210 | |

C.I. Basic Red 8.
C.I. Basic Violet 11.

(l) Fluorescent brightening agent dyes.—These materials are listed in vol. 4 of the Color Index under Fluorescent Brightening Agents (for textile usage). The C.I. B/A (Brightening Agent) numbers and applicable k values are indicated as follows:

C.I. B/A 2, k=.25
C.I. B/A 5, k=.2
C.I. B/A 9, k=1.35
C.I. B/A 25, k=.25
C.I. B/A 30, k=.2
C.I. B/A 53, k=1.35
C.I. B/A 56, k=.2
C.I. B/A 60, k=1.0
C.I. B/A 66, k=.25
C.I. B/A 69, k=1.0
C.I. B/A 74, k=.5
C.I. B/A 77, k=.5
C.I. B/A 3, k=1.0
C.I. B/A 6, k=.25
C.I. B/A 22, k=.23
C.I. B/A 26, k=1.7
C.I. B/A 46, k=2.3
C.I. B/A 54, k=1.35
C.I. B/A 57, k=1.35
C.I. B/A 61, k=.65
C.I. B/A 67, k=1.0
C.I. B/A 70, k=1.7
C.I. B/A 75, k=.5
C.I. B/A 78, k=2.65
C.I. B/A 4, k=.8
C.I. B/A 8, k=.5
C.I. B/A 24, k=.2
C.I. B/A 29, k=.5
C.I. B/A 47, k=.65
C.I. B/A 55, k=1.7
C.I. B/A 59, k=.25
C.I. B/A 65, k=.2
C.I. B/A 68, k=1.7
C.I. B/A 71, k=1.0
C.I. B/A 76, k=1.35

(m) Miscellaneous fluorescent dyes.—These materials are listed in the Color Index under various dye classifications. The particular dyes and their k values are indicated as follows:

C.I. Basic Orange 10, k=.25
C.I. Acid Yellow 7, k=.25
C.I. Solvent Yellow 44, k=.5
C.I. Disperse Yellow 31, k=.2
C.I. Basic Red 1, k=.25
C.I. Solvent Red 36, k=.5
C.I. Acid Red 87, k=1.0
C.I. Solvent Red 45, k=1.0
C.I. Disperse Yellow 13, k=.5
C.I. Direct Yellow 59, k=2.65
C.I. Disperse Yellow 11, k=.25
C.I. Basic Yellow 7, k=1.7
C.I. Basic Violet 10, k=.25
C.I. Acid Red 52, k=1.0
C.I. Acid Violet 7, k=1.0
C.I. Acid Red 50, k=.25
C.I. Developer 8, k=.5
C.I. Solvent Green 5, k=.25

(n) Fluorescent chemical compounds.—The following materials are characterized by k values in the range of from .25 to 1.7:

1'-dihydroxy-2'-acetonaphthone—$HOC_{10}H_6COCH_3$, k=.25

Fluoranthene—$C_{16}H_{10}$, represented by the structural formula:

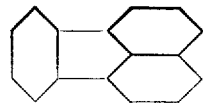

k=1.0

Pyrene—$C_{16}H_{10}$, represented by the structural formula:

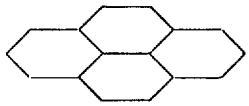

k=1.7

In the formulation of the fluorescent tracers of the invention, "color-formers" may be employed as well as fluorescent sensitizers. A color-former is an ordinary fluorescent or nonfluorescent dye material which has the ability to contribute color to or shift the fluorescent color of a dye mixture containing at least one sensitizer. A color-former, in other words, provides a characteristic color for the tracer. While the sensitizers of the invention have k values within the approximate range of .2 to 3, color-formers or ordinary dyes usually have k values somewhat less than .1 (even though they may yield intense coloration or high fluorescent brightness).

Many dyes are suitable for use as color-formers. These ordinary dyes or coloring materials, which are also listed in the Color Index, may be used in conjunction with any of the above-listed sensitizers, the only requirement being that the color-former must be selected for its solubility in the same solvent carrier in which the particular sensitizer is dissolved, as well as for its color characteristic.

Most of the sensitizers which are grouped above, fluoresce blue, bluish white, or bluish green, while a few fluoresce yellow, orange, or red. It has been found that only in a comparatively few instance will a fluorescent dye which is able to provide a substantially high dimensional sensitivity produce some color other than blue or green.

The sensitizers grouped above may be employed either singly, or in combination with one another. A prerequisite for combination of the sensitizers, of course, is that those combined shall each be compatible with a particular solvent system.

A wide variety of solvents may be utilized as carriers for the above-designated fluorescent sensitizers. The following listing in Table I includes solvent materials, both liquid and resinous (or plastic) which have been tested with the foregoing fluorescent sensitizers. In all cases, it has been found possible to obtain a desired dimensional threshold in the dye solution smaller than 250 millimicrons.

TABLE I—SOLVENT MATERIALS TESTED water
acidified water
alkaline water
ethylene glycol
diethylene glycol
triethylene glycol
polyethylene glycols (M.W.—200 to 6000)
ethylene glycol monobutyl ether
diethylene glycol monobutyl ether
ethylene glycol monethyl ether
diethylene glycol monethyl ether
polyoxyalkaline glycols ("Ucon fluids)
dimethyl formamide
N-methyl-2-pyrrolidone
dimethyl sulfoxide
N-vinyl-2-pyrrolidone
silicon oil (Corning 200)
nitroethane
polyester resin (Am. Cyanamid "Laminac")
alkyl resin (Amer. Cyan. "Rezyl")
rosin
methanol
ethanol
isopropanol
isodecanol
acetone
methyl ethyl ketone
methyl isobutyl ketone
diacetone alcohol
mesityl oxide
isophorone
ethyl amyl ketone
mineral thinner (naphtha)
kerosene
carbon tetrachloride
perchloroethylene
methylene chloride
fluorocarbon oil (Hooker "Florolube")
sodium petroleum sulfonate
urea formaldehyde resin (Am. Cyan. Beetle)
epoxy resin (Shell 'Epon")
vinyl resin (Union Carbide VYGH)

In addition to the above-listed solvents, it has been found that the solvent carriers listed in my copending application, Ser. No. 492,676, filed Oct. 4, 1965, now issued Pat. No. 3,311,479, for Penetrant Inspection Process and Composition, [now abandoned,] also function well as carriers for the fluorescent sensitizers of this invention.

The choice of a solvent system for use in conjunction with a particular sensitizer of the invention, and the manner of effecting the solution of the sensitizer are accomplished in accordance with procedures well known in the art. Thus, for example, a sensitizer which is normally relatively insoluble in mineral spirits may be coupled into solution with the latter by means of a glycol ether. Likewise, a sensitizer which is relatively insoluble in water may be coupled into a water solution by means of an alcohol additive or by use of a surfactant, such as ethoxylated alkylphenol. Although aliphatic mineral solvents have relatively low solvent capabilities for most of the sensitizers of the invention, the solution may still often be effected through the additional use of a small amount of aromatic mineral solvent, the latter materially increasing the ability of the liquid mixture to carry the sensitizer into solution.

It has been discovered that fluorescent materials produced in the manner described above may exhibit dimensional thresholds of fluorescence of the order of $2.5\times10^{-5}$ to $2\times10^{-6}$ cm. or less, if there is employed a proportional concentration of sensitizer of at least about 15 grams per pint. Referring again to FIG. 1, it will be noted that the value of $2.5\times10^{-5}$ cm., or 250 millimicrons, is equivalent to a sensitivity index $I_s$ value of 15. Thus, it will be understood that such an $I_s$ value of 15 (within about one order of magnitude), or greater, is achieved upon the dissolution in a suitable solvent of about 15 grams per pint, or more, of any of the sensitizers of the group specified.

It will be understood that the dissolution of a sensitizer having a k value of .2 in the proportional concentration of 15 grams per pint will yield a sensitivity index $I_s$ value of 3, which corresponds to a dimensional threshold of fluorescence of about 500 millimicrons. This sensitivity condition is well within one order of magnitude of a desired sensitivity threshold characteristic of 250 millimicrons, and such materials are, therefore, considered to be useful for the purpose of the invention. For sensitizers which have k values as low as .2, it is merely necessary to employ a proportional concentration of about 75 grams per pint in order to achieve a desired dimensional sensitivity of 250 millimicrons. Some of the sensitizers have exceptionally high solubilities in particular solvents, and may permit use at concentrations as high as about 300 grams per pint. Thus, a sensitizer having a k value of one (1) will, when used in a concentration of about 15 grams per pint, provide approximately a value of $I_s=kC=15$, with equivalent dimensional sensitivity of the order of $2.5\times10^{-5}$ cm. However, if the sensitizer is fluoranthene, and the solvent is N-methyl-2-pyrrolidone, the concentration may be increased up to a value of the order of 300 grams per pint, with a corresponding increase in dimensional sensitivity to a value of the order of $2\times10^{-6}$ cm. or less. Certain fluorescent coumarin dyes, notably C.I. Fluorescent Brightening Agents 68 and 69, also have excellent solubility in solvents such as N-methyl-2-pyrrolidone, dimethyl formamide, or dimethyl sulfoxide, and are thus capable of providing dimensional sensitivities in the range of $2\times10^{-6}$ cm. or less.

It may be noted that the minimum concentration of about 15 grams per pint, employed in accordance with the invention, is equivalent to about 3.3% concentration by weight. This value is well above the maximum values for the concentrations of fluorescent dyes employed in the prior art, which, as indicated above, have been of the order of .5% to 2%. The maximum allowable concentration depends only on the solubility of the particular sensitizer in a given solvent carrier. All of the above listed sensitizers will dissolve in appropriate solvents to concentrations of the order of 40 grams per pint or about 8% by weight, while a large number of the sensitizers will dissolve in suitable solvents to concentrations of the order of 100 grams per pint or about 20% by weight. A few of the sensitizers may be dissolved in appropriate solvents to concentrations greater than about 300 grams per pint, or about 60% by weight or more.

It should be pointed out that, although the limit of dimensional sensitivity for most solutions of sensitizers is about $2\times10^{-6}$ to $4\times10^{-6}$ cm., it is possible to extend the dimensional sensitivity of a given fluorescent tracer well down toward $10^{-7}$ cm. by means of a liquid developer technique which is the subject of my now issued U.S. Pat. No. 3,184,596, granted May 18, 1965, for Flaw Detection Method Using a Liquid Solvent Developer.

Primarily, as a result of the very low threshold film thickness exhibited by the fluorescent tracers of the invention, the use of said tracers offers advantages not heretofore obtainable in industrial inspection, production control, quality assurance, and other similar applications. For example, in the case of jet engine turbine blades, micro-cracks often occur which have dimensions on the order of $10^{-5}$ cm. In the case of heat resistant surface coatings for space vehicles, porosity defects may occur which likewise have dimensions on the order of $10^{-5}$ cm.

When employing a fluorescent penetrant tracer for flaw detection purposes, the process in its simplest form includes dipping the part to be tested in the penetrant, draining the part, cleaning the surface penetrant by washing (and in the case of non-washable penetrant, applying an emulsifier-coupler dip prior to washing), and finally inspecting the part under black light. In some cases, an additional step of applying a so-called developer is employed for the purpose of enhancing the fluorescent brightness of the flaw indications.

EXAMPLE NO. 1

As an example of the use of the Meniscus Method in connection with the chart of FIG. 1, a particular fluorescent substance (pyrene) present in a liquid solvent (ethylene glycol monethyl ether) at a concentration of 9 grams per pint exhibited a spot diameter of 1.45 mm. The equivalent sensitivity index $I_s$ value corresponding to this spot diameter was determined by reading on the chart across to the reference line 5, along line x, and was found to be 15 at line y. The specific sensitivity k of the substance (at this concentration) was then determined in accordance with the relationship $I_s=kC$. Thus, k=15 divided by 9, or 1.7. The equivalent dimensional sensitivity, or threshold film thickness, was also read from the chart by following line x across to the right hand scale of ordinates, and was found to be equal to 250 millimicrons.

EXAMPLE NO. 2

A penetrant tracer having the following formulation was prepared:

| | |
|---|---|
| Ethylene glycol monobutyl ether | 5 gal. |
| Fluoranthene | 15 lbs. |
| C.I. Brightening Agent 75 | 1 lb. 8 oz. |
| Base oil 100 pale | 55 gal. |

The above formulation is a typical medium-to-high sensitivity penetrant tracer, insoluble in water. It is suitable, e.g., for detecting cracks in weldments, and has a dimensional sensitivity of about 180 millimicrons.

EXAMPLE NO. 3

A penetrant tracer was prepared as follows:

| | | |
|---|---|---|
| Ethylene glycol monobutyl ether | gal. | 4 |
| Polyoxyethylated nonylphenol (average 45% ethylene oxide) | gal. | 2 |
| Fluoranthene | lbs. | 50 |
| C.I. Fluor. Brightening Agent 75 | lbs. | 3 |
| Refined sodium petroleum sulfonate (molecular weight approx. 425) | gal. | 13.75 |
| Base oil 100 pale | gal. | 35.5 |

The above formulation is a water washable penetrant tracer of high sensitivity, having a dimensional sensitivity of 143 millimicrons. It is suitable, among other uses, for the detection of micro-flaws in machine parts and ceramic materials.

EXAMPLE NO. 4

A penetrant tracer having the following formulation was prepared:

| | | |
|---|---|---|
| N-vinyl-2-pyrrolidone | gal. | 12 |
| Fluoranthene | lbs. | 75 |
| C.I. Fluor. Brightening Agent 75 | lbs. | 5 |
| Diethylene glycol monobutyl ether | gal. | 4 |
| Polyethylene glycol di-2-ethylhexoate, to 55 gal. | | |

The above formulation is non-water-soluble, and has a dimensional sensitivity of about 75 millimicrons. This tracer is particularly suitable for use in extremely high sensitivity application, in which tests are made for intergranular corrosion in metals, or fractures in crystal structures and the like.

EXAMPLE NO. 5

A penetrant tracer formulation was prepared as follows:

| | |
|---|---|
| C.I. Fluor. Brightening Agent 46 | 28 lbs. |
| C.I. Acid Yellow 7 | 3 lbs. 8 oz. |
| Triethylene glycol, to 55 gal. | |

The above formulation is water soluble, having a dimensional sensitivity of about 75 millimicrons. It is suitable for high sensitivity tests on parts employed in liquid oxygen systems. As will be noted, the formulation meets the requirement that such systems be maintained free from oil contamination.

EXAMPLE NO. 6

A penetrant tracer having the following formulation was prepared:

| | | |
|---|---|---|
| Diethylene glycol monobutyl ether | gal. | 9.2 |
| Fluoranthene | lbs. | 25 |
| C.I. Fluor. Brightening Agent 75 | lbs. | 5 |
| Polyethylene glycol di-2-ethylhexoate, to 55 gal. | | |

The above formulation is a high sensitivity, non-water-soluble penetrant tracer having a dimensional sensitivity of about 140 millimicrons. It is well suited for the penetrant inspection and detection of extremely small surface flaws.

Flux formulations of the invention may be employed in processes for detecting defects in soldered joints. Such processes usually include, as a primary step prior to inspection under black light, the removal of all excess fluorescence-tagged solder flux from the surface of the part to be examined. A suitable cleaner is used for this purpose, such as water in the case of water-soluble fluxes, or alcohol in the case of rosin-type fluxes. After the removal of the excess surface flux, there will remain minute entrapments of flux in cracks, or in interfacial areas where there is incomplete fusion between solder and base metal. Such small entrapments of the fluorescent flux sometimes can be viewed simply by exposure to black light. However, it may often be found desirable to enhance the fluorescent indications by applying a liquid developer of the aforementioned type to the soldered area. Such a developer will carry the fluorescent flux tracer into solution and allow it to diffuse out into a region where it can become easily seen.

EXAMPLE NO. 7

A soldering flux was prepared as follows:

| | |
|---|---|
| Glutamic acid hydrochloride | 31 lbs. |
| Urea | 18 lbs. |
| C.I. Fluor. Brightening Agent 46 | 27 lbs. |
| C.I. Acid Yellow 7 | 3 lbs. 8 oz. |
| Polyethylene glycol (molecular weight 200) to 55 gal. | |

The above soldering flux is of high sensitivity and particularly adapted for use in detecting cold solder joints, or other soldering imperfections. The initial dimensional sensitivity is 75 millimicrons. However, as the flux is heated during the soldering operation, the liquid boils off, leaving interfacial entrapments of substantially dry fluorescent sensitizer material. The film thickness of this residue is quite small, being of the order of a few millimicrons, and the dye concentration is correspondingly higher. Therefore, the ultimate dimensional sensitivity rating for the soldering flux (i.e., as a solid film) is about 10 millimicrons.

EXAMPLE NO. 8

A soldering flux was prepared in accordance with the following formulation:

| | | |
|---|---|---|
| Water white rosin | grams | 25 |
| Fluoranthene | do | 25 |
| Glutamic acid hydrochloride | do | 2.5 |
| N-vinyl-2-pyrrolidone | cc | 20 |
| Diacetone alcohol | cc | 175 |

The above soldering flux is of the rosin type and of high sensitivity. It has an initial dimensional sensitivity of about 110 millimicrons, and an ultimate dimensional sensitivity of about 20 millimicrons.

EXAMPLE NO. 9

A fluorescent tracer was prepared as follows:

| | Percent |
|---|---|
| C.I. Fluor. Brightening Agent 26 | 15 |
| C.I. Acid Violet 7 (color-former) | 1 |
| Diethylene glycol, to 100. | |

The above formulation provides an ink suitable for use in industrial marking, ballot marking, or as a business machine ink. It has a dimensional sensitivity of about 95 millimicrons. Such sensitivity level is essential for adequate performance of the ink, since, as may be understood, the latter must reveal its fluorescence even though in the form of an extremely thin film. Although a red ink is here provided, it will be realized that other colors, such as yellow or blue, can be obtained through change of the color-former dye.

EXAMPLE NO. 10

A flourescent tracer concentrate having the following formulation was prepared:

| | | |
|---|---|---|
| C.I. Fluor. Brightening Agent 26 | oz | 1 |
| Water | pints | 1 |
| Ethylene glycol monoethyl ether | do | 5 |

Dissolve the above and then add:

| | | |
|---|---|---|
| C.I. Fluor. Brightening Agent 57 | oz | 4 |

Ethylene glycol monoethyl ether, to 1 gal.

The above concentrate is liquid, and is suitable for use in pools, fountains, or waterfalls, for artistic display effects. When used, the concentrate is mixed with a suitable quantity of water. For example, pastel fluorescent shades are obtained by a dilution ratio of about 1500 to 1, medium shades are obtained by a dilution ratio of 1000 to 1, and deep shades of fluorescent color are obtained by a dilution ratio of 500 to 1. The above dye concentrate provides a blue fluorescent color. In this case, the C.I. Fluor. Brightening Agent 57 is used as a combination sensitizer and color-former dye. Others colors may, of course, be provided through the use of different or additional color-former dyes.

EXAMPLE NO. 11

A fluorescent tracer material having the following formulation was prepared:

| | Pounds |
|---|---|
| C.I. Fluor. Brightening Agent 26 | 5 |
| C.I. Acid Yellow 73—fluorescein (color-former) | 5 |
| C.I. Acid Red 87—Eosine J (sensitizer and color-former) | 15 |
| Sodium chloride, finely powdered | 25 |
| Silica aerogel | 5 |

The above formulation provides a tracer material in dry form, preferred for such uses as the marking of snowed-in airport runways, or as a sea marker for indicating the location of survivors at sea. The powders are blended throughly and packaged in moisture-tight containers. The salt is included for the purpose of causing ice or snow to melt so as to allow the fluorescent dyes to go into solution. The silica aerogel serves to render the product fluffy and light, so that it will spread readily over a large area of water, snow, or ice. This formulation exhibits a brilliant fluorescent orange color when in water solution. The color can be changed to a bright red by replacing the fluorescent with eosine, and it can be changed to a brilliant yellow-green by replacing the eosine with fluorescein. When this marker tracer is dissolved in water, it yields a dimensional sensitivity of the order of 100 millimicrons or smaller.

EXAMPLE NO. 12

A fluorescent tracer having the following formulation was prepared:

| | | |
|---|---|---|
| C.I. Fluor. Brightening Agent 26 | oz | 8 |

Water, to make 1 gal.

The above formulation is a fluorescent blue concentrate having a dimensional sensitvity of about 30 millimicrons, and being suitable for use as a leak tracer for water solutions. When so used, it should usually be diluted in water (e.g., in the proportion of 1 to 200). Its fluorescent color may be shifted to a bright green by the addition of a green color-former, such as C.I. Acid Yellow 73 (Fluorescein).

EXAMPLE NO. 13

A crayon having the following formulation was prepared:

| | |
|---|---|
| Polyethylene glycol (wax) | 3 lbs. 12 oz. |
| C.I. Fluor. Brightening Agent 26 | 3 oz. |
| C.I. No. 42735-Acid Blue 104 (color-former) | 3 oz. |
| White barytes | 3 lbs. |

In forming the above crayon, the polyethylene glycol (wax) was melted and raised to a temperature of about 150° F. The dyes and fillers were then added, with the aid of a high speed disperser, and dispersion was continued until blending was complete. The hot mixture was then poured into crayon molds. The resulting fluorescent wax had a dimensional sensitivity of about 60 millimicrons. The crayon was found useful for such purposes as marking radar plotting boards, maps, ballots, etc.

EXAMPLE NO. 14

A fluorescent plastic composition for use as a surface coating was prepared having the following percentage composition:

| | Percent |
|---|---|
| Fluoranthene | 14 |
| C.I. Fluor. Brightening Agent 75 | 1.5 |
| Polyester resin (Laminac No. 4110, trademark, American Cyanamid Co.) | 84.5 |

To the above resin composition was added as a catalyst, 80 cc. per gallon of methyl ethyl ketone peroxide. The mixture was applied in a thin film between two glass plates, and cured to a hard material having a bright green fluorescence, and having a dimensional sensitivity of about 90 millimicrons. A grainless fluorescent screen was thus provided, capable of converting to visible light ultra-violet images focused thereon. This screen may serve as a converter reticle, and is useful in various applications requiring the visual observation of ultra-violet images, e.g., microscopes, or converter cells in communication systems employing modulated ultra-violet radiation.

EXAMPLE NO. 15

A fluorescent tracer having the following composition was prepared:

| | | |
|---|---|---|
| C.I. Fluor. Brightening Agent 68 | gm | 120 |
| Eethoxylated nonylphenol (10 mols ethylene oxide per mol nonylphenol) | gal | ½ |
| Water, to make 1 gal. | | |

The above formulation is a fluorescent blue liquid suitable for marking textiles for cutting or sewing in the manufacture of garments. It is especially useful on dark colored fabrics which require tracers having a high level of sensitivity in order to reveal fluorescence. It has a dimensional sensitivity of about 200 millimicrons or less.

EXAMPLE NO. 16

A fluorescent tracer having the following composition was prepared:

| | | |
|---|---|---|
| C.I. Fluor. Brightening Agent 69 | grams | 128 |
| Glycerin, to make 1 gal. | | |

The above formulation has a bright blue fluorescence, and exhibits a dimensional sensitivity on the order of 200 millimicrons or less. It is particularly useful for application to rubber sealer gaskets, such as refrigerator seals, from which it marks off onto a mating part to show up any discrepancies in the fit of the gasket.

EXAMPLE NO. 17

A fluorescent tracer concentrate having the following composition was prepared:

| | | |
|---|---|---|
| C.I. Fluor. Brightening Agent 46 | lbs | 2 |
| Propylene glycol, to make 1 gal. | | |

This is a fluorescent blue material which may be used as an additive to water soluble soldering fluxes. A proportional concentration is preferred of about 4 oz. of the tracer concentrate per gallon of liquid soldering flux.

When used in this proportion, the tracer concentrate provides a dimensional threshold thickness of fluorescence of less than 250 millimicrons, suitable for the detection of unwanted residues of solder flux which may remain after a cleaning operation.

To facilitate the formulation of fluorescent tracer compositions in accordance with the invention, while allowing for the use of any of a variety of solvents which may be encountered, a kit can be prepared containing an assortment of sensitizer substances, together with an assortment of color-former dyes. The sensitizers and color-former dyes may be selected so as to provide a good range of typical materials. In using such a kit, it is a relatively simple matter to select a sensitizer which is compatible with a particular solvent system being tested. It is then quite easy to select a suitable color-former dye, if such is required, to adjust the dye concentrations to their optimum values, and to add any other ingredients, such as thickeners, fillers, or the like.

Although the invention has been described with reference to particular embodiments thereof, it will be understood that various changes may be made therein without departing from the spirit of the invention or the scope of the appended claims.

I claim:

1. In an inspection process in which thin films of a fluorescent tracer are revealed by a fluorescence response, the step of [preparing a fluorescent tracer by dissolving at least one sensitizer in a solvent carrier] *applying a fluorescent tracer to a test surface,* said fluorescent tracer consisting essentially of at least one sensitizer selected from the group consisting of fluorescent (di)aminostilbine(di) sulfonic acid dyes, fluorescent dibenzothiophene dyes, fluorescent monoazole dyes, fluorescent bisazole dyes, fluorescent coumarin dyes, fluorescent perylene dyes, fluorescent naphthalic acid imide dyes, fluorescent pyridotriazole dyes, fluorescent di-hydrocollidine dyes, pyrene, 1'-hydroxy-2'-acetonaphthone, fluorescent acridine dyes having Color Index designations of 46000, 46025, 46050, 46055, 46060, 46065, 46080, Basic Orange 14, 15, 16, 23, and Basic Yellow 6 and 9, fluorescent xanthene dyes having Color Index designations of 45000, 45005, 45006, 45010, 45015, 45020, 45050, 45090, 45100, 45105, 45155, 45165, 45210, Basic Red 8, and Basic Violet 11, fluorescent brightening agents having Color Index designations of C.I. Brightening Agents 2, 3, 4, 5, 6, 8, 9, 22, 24, 25, 26, 29, 30, 46, 47, 53, 54, 55, 56, 57, 59, 60, 61, 65, 66, 67, 68, 69, 70, 71, 74, 75, 76, 77, 78, and fluorescent dyes having Color Index designations of Basic Orange 10, Acid Yellow 7, Basic Yellow 7, Disperse Yellow 11, 13, and 31, Direct Yellow 59, Solvent Yellow 44, Solvent Green 5, Acid Red 50, 52, and 87, Basic Red 1, Basic Violet 10, Acid Violet 7, Developer 8, and Solvent Red 36 and 45, respectively, and a liquid solvent carrier for said sensitizer, said sensitizer being selectively used singly and in combination and being [present in said] *in solution in the* liquid solvent carrier within the range of proportional concentrations from at least about 15 grams per pint up to the limit of solubility of said sensitizer, whereby the dimensional threshold of fluorescence is adjusted to an operational value below about 250 millimicrons.

2. An inspection process in accordance with claim 1 in which said fluorescent tracer consists essentially of at least one sensitizer selected from the group consisting of fluorescent brightening agents having Color Index designations of 8, 22, 24, 25, 26, 29, 46, 53, 57, 68, 69, 75, 78, and dyes having Color Index designations of 49010 and 56205, respectively, and a solvent carrier for said sensitizer, said sensitizer being selectively used singly and in combination and being present in said solvent carrier within the range of proportional concentrations from at least about 15 grams per pint up to the limit of solubility of said sensitizer, whereby the dimensional threshold of fluorescence is adjusted to an operational value below about 250 millimicrons.

3. An inspection process in accordance with claim 1 in which said fluorescent tracer consists essentially of at least one sensitizer selected from the group consisting of fluorescent brightening agents having Color Index designations of 8, 22, 24, 25, 26, 29, 46, 53, 57, 68, 69, 75, 78, and dyes having Color Index designations of 49010 and 56205, respectively, a color-former dye imparting a characteristic color to said tracer, and a solvent carrier for said sensitizer, said sensitizer being selectively used singly and in combination and being present in said solvent carrier within the range of proportional concentrations from at least about 15 grams per pint up to the limit of solubility of said sensitizer, whereby the dimensional threshold of fluoresence is adjusted to an operational value below about 250 millimicrons.

4. An inspection process in accordance with claim 1 in which said fluorescent tracer consists essentially of at least one sensitizer selected from the group consisting of fluorescent brightening agents having Color Index designations of 8, 22, 24, 25, 26, 29, 46, 53, 57, 68, 69, 75, 78, and dyes having Color Index designations of 49010 and 56205, respectively, and a liquid solvent carrier for said sensitizer, said sensitizer being selectively used singly and in combination and being present in said liquid solvent carrier within the range of proportional concentrations from at least about 15 grams per pint up to the limit of solubility of said sensitizer, whereby the dimensional threshold of fluorescence is adjusted to an operational value below about 250 millimicrons.

5. An inspection process in accordance with claim 1 in which said fluorescent tracer consists essentially of at least one sensitizer selected from the group consisting of fluorescent brightening agents having Color Index designations of 8, 22, 24, 25, 26, 29, 46, 53, 57, 68, 69, 75, 78, and dyes having Color Index designations of 49010 and 56205, respectively, a color-former dye imparting a characteristic color to said tracer, and a liquid solvent carrier for said sensitizer, said sensitizer being selectively used singly and in combination and being present in said liquid solvent carrier within the range of proportional concentrations from at least about 15 grams per pint up to the limit of solubility of said sensitizer, whereby the dimensional threshold of fluorescence is adjusted to an operational value below about 250 millimicrons.

6. An inspection process in accordance with claim 1 in which said fluorescent tracer consists essentially of at least one sensitizer selected from the group consisting of fluorescent brightening agents having Color Index designations of 8, 22, 24, 25, 26, 29, 46, 53, 57, 68, 69, 75, 78, and dyes having Color Index designations of 49010 and 56205, respectively, and a resinous solvent carrier for said sensitizer, said sensitizer being selectively used singly and in combination and being present in said resinous solvent carrier within the range of proportional concentrations from at least about 15 grams per pint up to the limit of solubility of said sensitizer, whereby the dimensional threshold of fluorescence is adjusted to an operational value below about 250 millimicrons.

7. An inspection process in accordance with claim 1 in which said fluorescent tracer consists essentially of at least one sensitizer selected from the group consisting of fluorescent brightening agents having Color Index designations of 8, 22, 24, 25, 26, 29, 46, 53, 57, 68, 69, 75, 78, and dyes having Color Index designations of 49010 and 56205, respectively, a color-former dye imparting a characteristic color to said tracer and a resinous solvent carrier for said sensitizer, said sensitizer being selectively used singly and in combination and being present in said resinous solvent carrier within the range of proportional concentrations from at least about 15 grams per pint up to the limit of solubility of said sensitizer, whereby the dimensional threshold of fluorescence is adjusted to an operational value below about 250 millimicrons.

8. An inspection process in accordance with claim 1 in which said fluorescent tracer consists essentially of fluoranthene as a sensitizer, and a solvent carrier for said fluoranthene, said fluoranthene being present in said solvent carrier within the range of proportional concentrations of at least about 25 grams per pint up to the limit of solubility of said fluoranthene, whereby the dimensional threshold of fluorescence is adjusted to an operational value below about 250 millimicrons.

9. An inspection process in accordance with claim 1 in which said fluorescent tracer consists essentially of fluoranthene as a sensitizer, a color-former dye imparting a characteristic color to said tracer, and a solvent carrier for said fluoranthene, said fluoranthene being present in said solvent carrier within the range of proportional concentrations of at least about 25 grams per pint up to the limit of solubility of said fluoranthene, whereby the dimensional threshold of fluorescence is adjusted to an operational value below about 250 millimicrons.

10. An inspection process in accordance with claim 1 in which said fluorescent tracer consists essentially of pyrene as a sensitizer, and a solvent carrier for said pyrene, said pyrene being present in said solvent carrier within the range of proportional concentrations of at least about 15 grams per pint up to the limit of solubility of said pyrene, whereby the dimensional threshold of fluorescence is adjusted to an operational value below about 250 millimicrons.

11. An inspection process in accordance with claim 1 in which said fluorescent tracer consists essentially of pyrene as a sensitizer, a color-former dye imparting a characteristic color to said tracer, and a solvent carrier for said pyrene, said pyrene being present in said solvent carrier within the range of proportional concentrations of at least about 15 grams per pint up to the limit of solubility of said pyrene, whereby the dimensional threshold of fluorescence is adjusted to an operational value below about 250 millimicrons.

12. An inspection process in accordance with claim 1 in which said fluorescent tracer consists essentially of at least one sensitizer selected from the group consisting of pyrene; 1′-hydroxy-2-acetonaphthone; fluorescent acridine dyes having Color Index designations of 46000, and 46025, 46050, 46055, 46060, 46065, Basic Orange 14, 15, 16, 23, and Basic Yellow 6 and 9; fluorescent xanthene dyes having Color Index designations of 45000, 45005, 45006, 45010, 45015, 45020, 45050, 45090, 45095, 45100, 45105, 45155, 45165, 45210, Basic Red 8, and Basic Violet 11; fluorescent brightening agents having Color Index designations of C.I. Brightening Agents 2, 3, 4, 5, 6, 8, 9, 22, 24, 25, 26, 29, 30, 46, 47, 53, 54, 55, 56, 57, 59, 60, 61, 65, 66, 67, 68, 69, 70, 71, 74, 75, 76, 77, 78; and fluorescent dyes havin Color Index designations of Basic Orange 10, Acid Yellow 7, Basic Yellow 7, Disperse Yellow 11, 13, and 31, Direct Yellow 59, Solvent Yellow 44, Solvent Green 5, Acid Red 50, 52, and 87, Basic Red 1, Basic Violet 10, Acid Violet 7, Developer 8, and Solvent Red 36 and 45, respectively, and a solvent carrier for said sensitizer, said sensitizer being selectively used singly and in combination and being present in said solvent carrier within the range of proportional concentrations from at least about 15 grams per pint up to the limit of solubility of said sensitizer, whereby the dimensional threshold of fluorescence is adjusted to an operational value below about 250 millimicrons.

13. An inspection process in accordance with claim 1 in which said fluorescent tracer consists essentially of at least one sensitizer selected from the group consisting of pyrene; 1′-hydroxy-2′-acetonaphthone; fluorescent acridine dyes having Color Index designations of 46000, 46025, 46050, 46055, 46060, 46065, 46080, Basic Orange 14, 15, 16, and 23, and Basic Yellow 6 and 9; fluorescent xanthene dyes having Color Index designations of 45000, 45005, 45006, 45010, 45015, 45020, 45050, 45090, 45095, 45100, 45105, 45155, 45165, 45210. Basic Red 8, and Basic Violet 11; fluorescent brightening agents having Color Index designations of C.I. Brightening Agents 2, 3, 4, 5, 6, 8, 9, 22, 24, 25, 26, 29, 30, 46, 47, 53, 54, 55, 56, 57, 59, 60, 61, 65, 66, 67, 68, 69, 70, 71, 74, 75, 76, 77, and 78; and fluorescent dyes having Color Index designations of Basic Orange 10, Acid Yellow 7, Basic Yellow 7, Disperse Yellow 11, 13, and 31, Direct Yellow 59, Solvent Yellow 44, Solvent Green 5, Acid Red 50, 52, ard 87, Basic Red 1, Basic Violet 10, Acid Violet 7, Developer 8, and Solvent Red 36 and 45, respectively, a color-former dye imparting a characteristic color to said tracer, and a solvent carrier for said sensitizer, said sensitizer being selectively used singly and in combination and being present in said solvent carrier within the range of proportional concentrations from at least about 15 grams per pint up to the limit of solubility of said sensitizer, whereby the dimensional threshold of fluorescence is adjusted to an operational value below about 250 millimicrons.

14. An inspection process in accordance with claim 1 in which said fluorescent tracer consists essentially of at least one sensitizer selected from the group consisting of fluoranthene; pyrene; 1'-hydroxy-2'-acetonaphthone; fluorescent acridine dyes having Color Index designations of 46000, 46025, 46050, 46055, 46060, 46065, 46080, Basic Orange 14, 15, 16 and 23, and Basic Yellow 6 and 9; fluorescent xanthene dyes having Color Index designations of 45000, 45005, 45006, 45010, 45015, 45020, 45050, 45090, 45095, 45100, 45105, 45155, 45165, 45210, Basic Red 8 and Basic Violet 11; fluorescent brightening agents having Color Index designations of C.I. Brightening Agents 2, 3, 4, 5, 6, 8, 9, 22, 24, 25, 26, 29, 30, 46, 47, 53, 54, 55, 56, 57, 59, 60, 61, 65, 66, 67, 68, 69, 70, 71, 74, 75, 76, 77, 78; and fluorescent dyes having Color Index designations of Basic Orange 10, Acid Yellow 7, Basic Yellow 7, Disperse Yellow 11, 13, and 31, Direct Yellow 59, Solvent Yellow 44, Solvent Green 5, Acid Red 50, 52, and 87, Basic Red 1, Basic Violet 10, Acid Violet 7, Developer 8, and Solvent Red 36 and 45, respectively, and a liquid solvent carrier for said sensitizer, said sensitizer being selectively used singly and in combination and being present in said liquid solvent carrier within the range of proportional concentrations from at least about 25 grams per pint up to the limit of solubility of said sensitizer, whereby the dimensional threshold of fluorescence is adjusted to an operational value below about 250 millimicrons.

15. An inspection process in accordance with claim 1 in which said fluorescent tracer consists essentially of at least one sensitizer selected from the group consisting of fluoranthene; pyrene; 1'-hydroxy-2'-acetonaphthone; fluorescent acridine dyes having Color Index designations of 46000, 46025, 46050, 46055, 46060, 46065, 46080, Basic Orange 14, 15, 16 and 23, and Basic Yellow 6 and 9; fluorescent xanthene dyes having Color Index designations of 45000, 45005, 45006, 45010, 45015, 45020, 45050, 45090, 45095, 45100, 45105, 45155, 45165, 45210, Basic Red 8, and Basic Violet 11; fluorescent brightening agents having Color Index designations of C.I. Brightening agents 2, 3, 4, 5, 6, 8, 9, 22, 24, 25, 26, 29, 30, 46, 47, 53, 54, 55, 56, 57, 59, 60, 61, 65, 66, 67, 68, 69, 70, 71, 74, 75, 76, 77, 78; and flourescent dyes having Color Index designations of Basic Orange 10, Acid Yellow 7, Basic Yellow 7, Disperse Yellow 11, 13, and 31, Direct Yellow 59, Solvent Yellow 44, Solvent Green 5, Acid Red 50, 52, and 87, Basic Red 1, Basic Violet 10, Acid Violet 7, Developer 8, and Solvent Red 36 and 45, respectively, a color-former dye imparting a characteristic color to said tracer, and a liquid solvent carrier for said sensitizer, said sensitizer being selectively used singly and in combination and being present in said liquid solvent carrier within the range of proportional concentrations from at least about 25 grams per pint up to the limit of solubility of said sensitizer, whereby the dimensional threshold of fluorescence is adjusted to an operational value below about 250 millimicrons.

16. An inspection process in accordance with claim 1 in which said fluorescent tracer consists essentially of at least one sensitizer selected from the group consisting of fluoranthene; pyrene; 1'-hydroxy-2'-acetonaphthone; fluorescent acridine dyes having Color Index designations of 46000, 46025, 46050, 46055, 46060, 46065, 46080, Basic Orange 14, 15, 16, and 23, and Basic Yellow 6 and 9; fluorescent xanthene dyes having Color Index designations of 45000, 45005, 45006, 45010, 45015, 45020, 45050, 45090, 45095, 45100, 45105, 45155, 45165, 45210, Basic Red 8, and Basic Violet 11; fluorescent brightening agents 2, 3, 4, 5, 6, 8, 9, 22, 24, 25, 26, 29, 30, 46, 53, 54, 55, 56, 57, 59, 60, 61, 65, 66, 67, 68, 69, 70, 71, 74, 75, 77, 78; and fluorescent dyes having Color Index designations of Basic Orange 10, Acid Yellow 7, Basic Yellow 7, Disperse Yellow 11, 13, and 31, Direct Yellow 59, Solvent Yellow 44, Solvent Green 5, Acid Red 50, 52, and 87, Basic Red 1, Basic Violet 10, Acid Violet 7, Developer 8, and Solvent Red 36 and 45, respectively, and a resinous solvent carrier for said sensitizer, said sensitizer being selectively used singly and in combination and being present in said resinous solvent carrier within the range of proportional concentration from at least about 25 grams per pint up to the limit of solubility of said sensitizer, whereby the dimensional threshold of fluorescence is adjusted to an operational value below about 250 millimicrons.

17. An inspection process in accordance with claim 1 in which said fluorescent tracer consists essentially of at least one sensitizer selected from the group consisting of fluoranthene; pyrene; 1'-hydroxy-2'-acetonaphthone; fluorescent acridine dyes having Color Index designations of 46000, 46025, 46050, 46055, 46060, 46065, 46080, Basic Orange 14, 15, 16 and 23; and Basic Yellow 6 and 9; fluorescent xanthene dyes having Color Index designations of 45000, 45005, 45006, 45010, 45015, 45020, 45050, 45090, 45095, 45100, 45105, 45155, 45165, 45210, Basic Red 8, and Basic Violet 11; fluorescent brightening agents having Color Index designations of C.I. Brightening agents 2, 3, 4, 5, 6, 8, 9, 22, 24, 25, 26, 29, 30, 46, 47, 53, 54, 55, 56, 57, 59, 60, 61, 65, 66, 67, 68, 69, 70, 71, 74, 75, 76, 77, 78; and fluorescent dyes having Color Index designations of Basic Orange 10, Acid Yellow 7, Basic Yellow 7, Disperse Yellow 11, 13, and 31, Direct Yellow 59, Solvent Yellow 44, Solvent Green 5, Acid Red 50, 52, and 87, Basic Red 1, Basic Violet 10, Acid Violet 7, Developer 8, and Solvent Red 36 and 45, respectively a color-former dye imparting a characteristic color to said tracer, and a resinous solvent carrier for said sensitizer, said sensitizer being selectively used singly and in combination and being present in said resinous solvent carrier within the range of proportional concentrations from at least about 25 grams per pint up to the limit of solubility of said sensitizer, whereby the dimensional threshold of fluorescence is adjusted to an operational value below about 250 millimicrons.

18. An inspection process in accordance with claim 1 in which said fluorescent tracer consists essentially of at least one sensitizer selected from the group consisting of fluorescent (di)aminostilbine(di)sulfonic acid dyes, fluorescent dibenzothiophene dyes, fluorescent monoazole dyes, fluorescent bisazole dyes, fluorescent coumarin dyes, fluorescent perylene dyes, fluorescent naphthalic acid imide dyes, fluorescent pyridotriazole dyes, and fluorescent dihydrocollidine dyes, respectively, and a solvent carrier for said sensitizer, said sensitizer being selectively used singly and in combination and being present in said solvent carrier within the range of proportional concentrations of from at least about 15 grams per pint up to the limit of solubility of said sensitizer, whereby the dimensional threshold of fluorescence is adjusted to an operational value below about 250 millimicrons.

19. An inspection process in accordance with claim 1 in which said fluorescent tracer consists essentially of at least one sensitizer selected from the group consisting of fluorescent (di)aminostilbine(di)sulfonic acid dyes, fluorescent dibenzothiophene dyes, fluorescent monoazole dyes, fluorescent bisazole dyes, fluorescent coumarin dyes, fluorescent perylene dyes, fluorescent naphthalic acid imide dyes, fluorescent pyridotriazole dyes, and fluorescent di-hydrocollidine dyes, respectively, a color-former dye imparting a characteristic color to said tracer, and a solvent carrier for said sensitizer, said sensitizer being selectively used singly and in combination and being present in said solvent carrier within the range of proportional concentrations of from at least about 15 grams per pint up to the limit of solubility of said sensitizer, whereby the dimensional threshold of fluorescence is adjusted to an operational value below about 250 millimicrons.

20. An inspection process in accordance with claim 1 in which said fluorescent tracer consists essentially of at least one sensitizer selected from the group consisting of fluorescent (di)aminostilbine(di)sulfonic acid dyes, fluorescent dibenzothiophene dyes, fluorescent monoazole dyes, fluorescent bisazole dyes, fluorescent coumarin dyes, fluorescent perylene dyes, fluorescent naphthalic acid imide dyes, fluorescent pyridotriazole dyes, and fluorescent di-hydrocollidine dyes, respectively, and a liquid solvent carrier for said sensitizer, said sensitizer being selectively used singly and in combination and being present in said liquid solvent carrier within the range of proportional concentrations of from at least about 25 grams per pint up to the limit of solubility of said sensitizer, whereby the dimensional threshold of fluorescence is adjusted to an operational value below about 250 millimicrons.

21. An inspection process in accordance with claim 1 in which said fluorescent tracer consists essentially of at least one sensitizer selected from the group consisting of fluorescent (di)aminostilbine(di)sulfonic acid dyes, fluorescent dibenzothiophene dyes, fluorescent monoazole dyes, fluorescent bisazole dyes, fluorescent coumarin dyes, fluorescent perylene dyes, fluorescent naphthalic acid dyes, fluorescent pyridotriazole dyes, and fluorescent dihydrocollidine dyes, respectively, a color-former dye imparting a characteristic color to said tracer, and a liquid solvent carrier for said sensitizer, said sensitizer being selectively used singly and in combination and being present in said liquid solvent carrier within the range of proportional concentrations of from at least about 25 grams per pint up to the limit of solubility of said sensitizer, whereby the dimensional threshold of fluorescence is adjusted to an operational value below about 250 millimicrons.

22. An inspection process in accordance with claim 1 in which said fluorescent tracer consists essentially of at least one sensitizer selected from the group consisting of fluorescent (di)aminostilbine(di)sulfonic acid dyes, fluorescent dibenzothiophene dyes, fluorescent monoazole dyes, fluorescent bisazole dyes, fluorescent coumarin dyes, fluorescent perylene dyes, fluorescent naphthalic aicid imide dyes, fluorescent pyridotriazole dyes, and fluorescent di-hydrocollidine dyes, respectively, and a resinous solvent carrier for said sensitizer, said sensitizer being selectively used singly and in combination and being present in said resinous solvent carrier within the range of proportional concentrations of from at least about 25 grams per pint up to the limit of solubility of said sensitizer, whereby the dimensional thershold of fluorescence is adjusted to an operational value below about 250 millimicrons.

23. An inspection process in accordance with claim 1 in which said fluorescent tracer consists essentially of at least one sensitizer selected from the group consisting of fluorescent (di)aminostilbine(di)sulfonic acid dyes, fluorescent dibenzothiophene dyes, fluorescent monoazole dyes, fluorescent bisazole dyes, fluorescent coumarin dyes, fluorescent perylene dyes, fluorescent naphthalic acid amide dyes, fluorescent pyridotriazole dyes, and fluorescent di-hydrocollidine dyes, respectively, a color-former dye imparting a characteristic color to said tracer, and a resinous solvent carrier for said sensitizer, said sensitizer being selectively used singly and in combination and being present in said resinous solvent carrier within the range of proportional concentrations of from at least about 25 grams per pint to the limit of solubility of said sensitizer, whereby the dimensional threshold of fluorescence is adjusted to an operational value below about 250 millimicrons.

References Cited

The following references, cited by the Examiner, are of record in the patent file of this patent or the original patent.

UNITED STATES PATENTS

| | | | |
|---|---|---|---|
| 2,733,216 | 1/1956 | Eichholz et al. | 252—301.2 |
| 2,953,530 | 9/1960 | Switzer | 252—301.2 |
| 3,108,187 | 10/1963 | Thornbury | 252—301.2 |

FOREIGN PATENTS

| | | |
|---|---|---|
| 569,920 | 6/1945 | Great Britain. |
| 143,492 | 8/1961 | U.S.S.R. |

OTHER REFERENCES

Dement: Fluorochemistry, 1945. pp. 160, 187, 194 and 198.

TOBIAS E. LEVOW, Primary Examiner

A. P. DEMERS, Assistant Examiner

U.S. Cl. X.R.

250—71, 71.5